United States Patent [19]
Takasaki

[11] Patent Number: 5,954,578
[45] Date of Patent: Sep. 21, 1999

[54] AIR CONDITIONER FOR A VEHICLE

[75] Inventor: Junji Takasaki, Okazaki, Japan

[73] Assignee: Denso Corporation, Kariya, Japan

[21] Appl. No.: 08/890,840

[22] Filed: Jul. 10, 1997

[30] Foreign Application Priority Data

Aug. 5, 1996 [JP] Japan ................................. 8-206054
Jun. 24, 1997 [JP] Japan ................................. 9-167474

[51] Int. Cl.⁶ ..................................................... B60H 1/26
[52] U.S. Cl. ............................... 454/121; 165/42; 165/76; 454/126; 454/156
[58] Field of Search ........................... 454/69, 121, 126, 454/156, 159, 160, 161; 62/298; 165/42, 43, 76

[56] References Cited

U.S. PATENT DOCUMENTS 3,679,531  7/1972  Wienand et al. ...................... 454/159
4,475,445  10/1984  Dietzsch et al. ........................ 454/159
5,775,407  7/1998  Inoue ...................................... 165/42

FOREIGN PATENT DOCUMENTS 56-82628   7/1981  Japan ................................. 454/156
62-137219  6/1987  Japan ................................. 454/69
A-5-58144  3/1993  Japan .

Primary Examiner—Harold Joyce
Attorney, Agent, or Firm—Harness, Dickey & Pierce, PLC

[57] ABSTRACT

A temperature adjusting unit portion is constructed by two division cases, and the two division cases have vertically divided type case structure, each of which has a division surface in a vertical direction. An evaporator and a heater are held and accommodated in the division cases. Between the division cases of the division case below the evaporator, there is provided a sealing member formed in a stick shape and in a circular shape in a cross section thereof.

14 Claims, 4 Drawing Sheets

LEFT ←――― VEHICLE WIDTH DIRECTION ―――→ RIGHT

COMPRESSING DIRECTION →

AIR CONDITIONER FOR A VEHICLE

BACKGROUND OF THE INVENTION

1. Field of the Invention

The present invention relates to an air conditioner for a vehicle, and especially relates an assembling structure of an air conditioner for a vehicle.

2. Description of Related Art

Conventionally, as a case structure of an air conditioner for a vehicle, there has been known an integrated unit where an evaporator 100 and a heater core 101 are held (disposed) within an identical division case as shown in FIG. 6.

The integrated unit is constructed to accommodate and hold the evaporator 100 and the heater 200 within the identical case to reduce the number of cases. Referring to the figure, in a state where the air conditioner for a vehicle is mounted on the vehicle, after the evaporator 100 and the heater core 101 are inserted along an arrow into a lower unit case 102 disposed at the lowest position and is accommodated therein, an upper unit case 103 is assembled to cover thereon from the upper side.

The upper unit case 103 and the lower unit case 102 are assembled in such a manner that the divided (connecting) surfaces are disposed in a horizontal direction. Because, if the division surfaces are disposed in a vertical direction, there occurs a problem that drain water generated in the evaporator 100 leaks between the division surfaces.

To perform a function of the air conditioner for a vehicle, a plurality of cases and each of air conditioning functional parts are assembled to the upper unit case 102 and the lower unit case 103. Hereinafter, the plurality of cases and each of the air conditioning functional parts will be described briefly.

Into the lower unit case, there is provided an air-mixing door 104 for adjusting an amount of cool air having passed through the evaporator 100 to be blown toward a heater 101.

At a side of the evaporator 100, there is detachably provided a cover 105 for covering one side surface of the evaporator 100, through which the evaporator 100 can be checked or changed.

In the cover 105, there is formed a connecting opening 107 to be connected to a blower unit portion 106. Through the connecting opening 107, air generated in the blower unit portion 106 is blown into the evaporator 100 or the heater core 101.

At an upper portion of the upper unit case 103, there are disposed switching doors 108 and 109 for switching a flow direction of conditioned air. At an upper side of the upper unit case 103, there are disposed two cases 110 and 111 laminated one another.

In the case 110, there are disposed air outlet switching doors 112 and 113. Further, there are formed air opening portions 114–117 corresponding to predetermined air outlets provided in a passenger compartment of the vehicle.

To the lower unit case 102, there are attached two cases 118 and 119 laminated one another. In this way, there is formed an air passage through which warm air having passed through the heater core 101 is blown upwardly and then is blown downwardly.

As described above, even the integrated unit capable of reducing the number of the parts conventionally is constructed such that a plurality of cases are assembled while being laminated in a vertical, lateral, or longitudinal direction. There is a problem in that the number of molding dies and the number of assembling processes are increased due to the increase of the number of the parts.

SUMMARY OF THE INVENTION

The present invention has been accomplished in view of the above-mentioned problem, and an object of the present invention is to reduce the number of the parts in the integrated unit.

According to the present invention, an air conditioning case is constructed by two division cases of vertically divided type, each of which has a division surface in a vertical direction, and a sealing member is provided between said division surfaces below said cooling heat exchanger in the gravitational direction, for sealing between said division surfaces.

In this way, the air conditioning case can be constructed by two division cases, the number of the parts can be reduced, and the number of assembling processes can be also reduced by the reduction of the parts. As a result, it is possible to provide an air conditioner for vehicle with less expense.

When the air conditioning case is constructed by two division cases of vertically divided type, each of which has a division surface in a vertical direction, there occurs a problem that condensed water generated in the cooling heat exchanger may leak between the division surfaces to the outside of the case; however, because the sealing member is provided between the division surfaces at the division portions of the division cases, it is possible to prevent the condensed water from leaking between the division surfaces.

Further, it is preferable that the sealing member should be formed in a stick shape and substantially in a circular shape in a cross section thereof.

In this way, because the sealing member is formed in the stick shape and substantially in the circular shape in the cross section thereof, when the sealing member is installed to be accommodated and disposed in the sealing member accommodating portion, it is possible to improve the working efficiency by eliminating the direction for an installation thereof.

It is also preferable that, in a state where the division cases are assembled, inside or outside the sealing member accommodating portion and the insertion portion, a projection portion projecting toward the other division surface should be formed in one division surface of the division cases, and a groove-shaped groove portion into which said projecting portion is fit should be formed on the other division surface.

In this way, for example, in the case the projection portion and the groove portion are disposed inside the sealing accommodating portion and the insertion portion, when the condensed water generated in the evaporator flows between the division surfaces, the condensed water firstly passes through a clearance where the projection portion and the groove portion are fit and then reaches the sealing member.

The clearance forms a labyrinth structure by the projection portion and the groove portion which are fit each other. As a result, it becomes difficult for the condensed water to reach the sealing member 25, so that the condensed water can be further prevented from leaking between the division surfaces.

On the other hand, in the case the projection portion and the groove portion are disposed inside the sealing member accommodating portion and the insertion portion, the similar effect can be also obtained.

DETAILED DESCRIPTION OF THE PREFERRED EMBODIMENTS

Embodiments according to the present invention will be described hereinafter with reference to the drawings.

Figure 1:
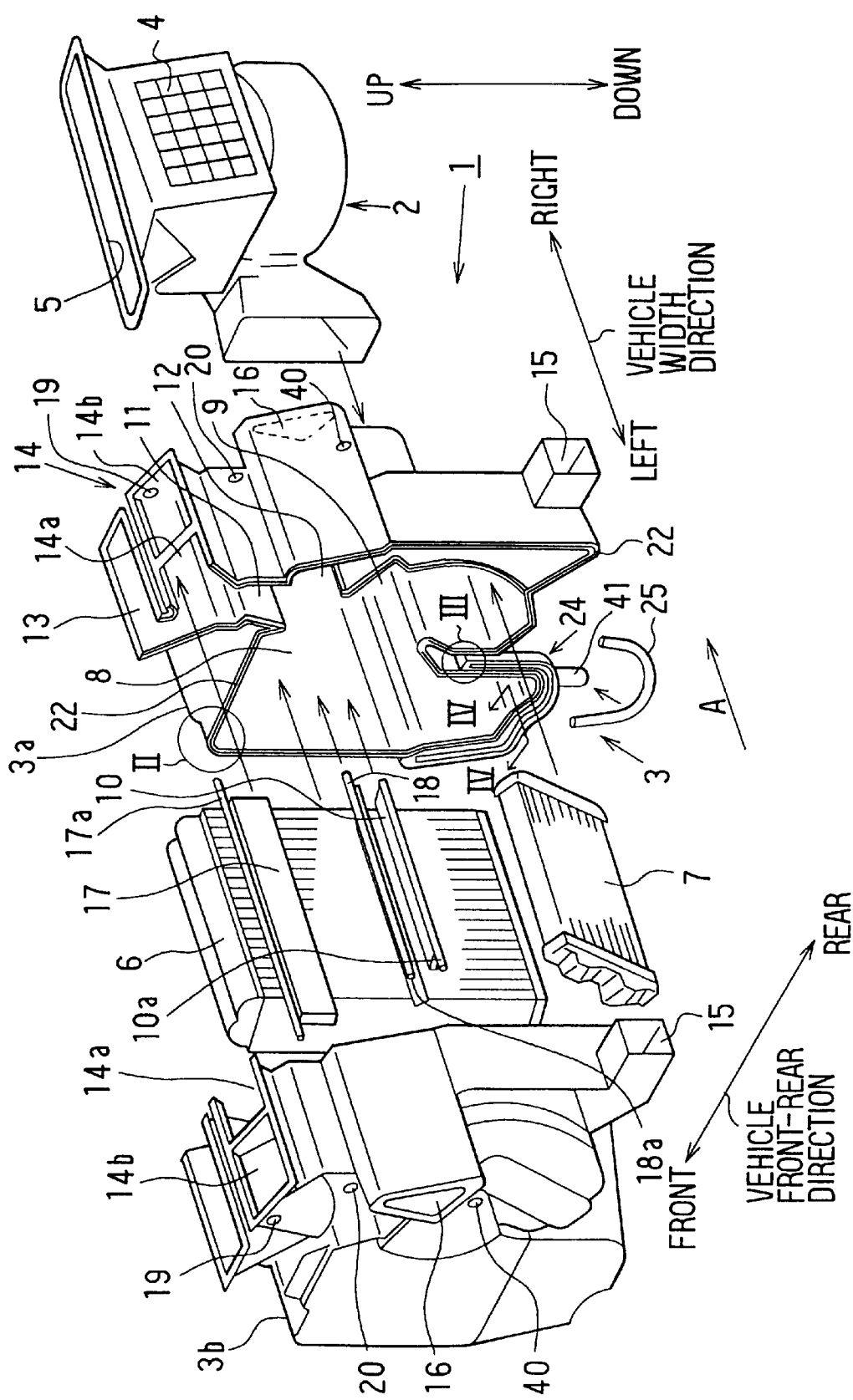
FIG. 1 is a view showing a disassembled structure of an air conditioner for a vehicle according to an embodiment of the present invention.

FIG. 1 is a structural view showing an assembled structure of an air conditioner for a vehicle. In FIG. 1, there are indicated a vehicle front-rear direction, a vehicle width direction, and an up-down direction, these indicate directions when the air conditioner is mounted on the vehicle.

As shown in FIG. 1, in this embodiment, the air conditioner 1 for a vehicle is generally constructed by an inside/outside air blower unit portion 2, a temperature adjusting unit portion 3 for adjusting a temperature of the air blown from the inside/outside air blower unit portion 2.

The air conditioner 1 according to this embodiment is for the vehicle having a left-side steering wheel, and the inside air/outside air blower unit 2 is disposed at a foot portion at a side of an assistant passenger's seat within an instrumental panel (not shown) in a passenger compartment.

The temperature adjusting unit portion 3 is lined with the inside/outside air blower unit portion 2 in the vehicle width direction and is disposed at a central portion in the vehicle width direction.

In the inside/outside air blower unit portion 2, there are provided an inside air introduction port 4, an outside air introduction port 5, and an inside air/outside air switching door (not shown) for selectively opening and closing these introduction ports 4 and 5. Within the inside/outside air blower unit portion 2, there is provided a blower (not shown), the inside air or outside air selected by the inside air/outside air switching door is blown into the temperature adjusting unit portion 3 by the blower.

Next, the temperature adjusting unit portion 3 will be described in detail.

The temperature adjusting unit portion 3 constructs therein a passage extending into the passenger compartment by connecting two division cases 3a and 3b made of resin such as polypropylene. In the temperature adjusting unit portion 3, there are accommodated and held an evaporator 6 for cooling air (inside air or outside air) taken into the temperature adjusting unit portion 3, and a heater core 7 for heating the air (inside air or outside air) having passed through the evaporator 6.

The evaporator 6 constructs a part of a refrigeration cycle apparatus (not shown) mounted on the vehicle. The refrigeration cycle apparatus is of a known type which includes a compressor, a condenser, decompressing means, and the above-described evaporator 6.

The heater core 7 is of a known type which heats air passing therethrough by using engine cooling water of the vehicle as heat source.

In the present invention, each of two division cases 3a and 3b has a division surface in a vertical direction (the up-down direction in FIG. 1), i. e., vertically divided type case structure. In this embodiment, the two division cases 3a and 3b can be divided in the left-right direction (the vehicle width direction).

Two division cases 3a and 3b are connected by connecting means (not shown) such as screws, C-shaped clips, and claw fittings. In a state where the division cases 3a and 3b are connected, the evaporator 6 and the heater core 7 are accommodated and held therein while being sandwiched between those cases 3a and 3b. In this state, the evaporator 6 and the heater core 7 are lined in the vehicle front-rear direction.

When the division cases 3a and 3b are assembled and the evaporator 6 and the heater core 7 are accommodated in the temperature adjusting unit portion 3, there are formed, in the temperature adjusting unit portion 3, a cool air passage 8 through which the cool air having passed through the evaporator 6 bypasses the heater core 7 and a warm air passage 9 through which the warm air heated while passing through the heater core 7 flows.

Within the temperature adjusting unit portion 3, there is provided an air-mixing door 10 for adjusting a temperature of conditioned air blown out from the temperature adjusting unit portion 3 by adjusting an air amount ratio between the cool air passage 8 and the warm air passage 9.

Further, in a state where the division cases 3a and 3b are assembled, in the temperature adjusting unit portion 3, there are formed passages 11 and 12 at downstream sides of the cool air passage 8 and the warm air passage 9, for introducing conditioned air, a temperature of which is adjusted by the air-mixing door 10, into the passenger compartment.

More specifically, the passages include the first passage 11 extending from the lower side (downward direction) to the upper side (upward direction) and include a first passage 11 to introduce the conditioned air toward an upper half body of a passenger or an inner surface of a windshield of the vehicle and the second passage 12 extending from the upper side to the lower side to introduce the conditioned air toward the lower half body of the passenger.

An air downstream portion of the first passage 11 is branched into two passages, and at each end of the branched passages, there are formed a defroster opening portion 13 for blowing the conditioned air toward the inner surface of the windshield of the vehicle and a face opening portion 14 for blowing the conditioned air toward the upper half body of the passenger.

The face opening portion 14 includes three opening portions of a center face opening portion 14a for blowing the conditioned air substantially from a central portion in the vehicle width direction, and side face opening portions 14b for blowing the conditioned air from both ends in the vehicle width direction.

At an air downstream side of the second passage 12, there is formed a rear-seat foot opening 15 for blowing the conditioned air toward feet of the passenger at a rear seat. Further, at an upstream side of the rear-seat foot opening portion 15, there is formed a front-seat foot opening portion 16 for blowing the conditioned air toward feet of the passenger at a front seat.

In the temperature adjusting unit portion 3, there are provided switching doors 17 and 18 for opening and closing the above-described opening portions 14–16 to switch the air outlet mode.

In this embodiment, the above-described air-mixing door 10 and the switching doors 17 and 18 are rotatably held while being sandwiched between the division cases 3a and 3b in the state where the division cases 3a and 3b are assembled More specifically, as shown in FIG. 1, in the division case 3b, there is formed an insertion hole 40 into which one end portion of a rotary shaft 10a of the air-mixing door 10 in an axial direction thereof is inserted. Further, in the division case 3a, there is also formed an insertion hole 40 into which the other end portion of the rotary shaft 10a in the axial direction is inserted.

In the division case 3b, there are formed insertion holes into which one end portions of rotary shafts 17a and 18a of the switching doors 17 and 18 in axial directions thereof are inserted, respectively Further, in the division case 3a, there are also formed insertion holes 19 and 20 to which the other end portions of the rotary shafts 17a and 18a are inserted, respectively.

A method for attaching these air-mixing door 10, the switching door 17 and 18 into the temperature adjusting unit portion 3 will be briefly described. Before the division case 3a and the division case 3b are assembled, one end portions of the rotary shafts 10a, 17a, and 18a in the axial direction are respectively inserted into the insertion holes 40, 19, and 20 formed in the division case 3a, which correspond to the rotary shafts 10a, 17a, and 18a.

Next, the division cases 3a and 3b are assembled in such a manner that the other end portions of the rotary shafts 10a, 17a, and 18b are inserted into the insertion holes 40, 19, and 20 formed in the division case 3b.

Next, connecting portions (division surfaces) of the division case 3a and the division case 3b will be described with reference to FIGS. 1 to 4.

Figure 2:
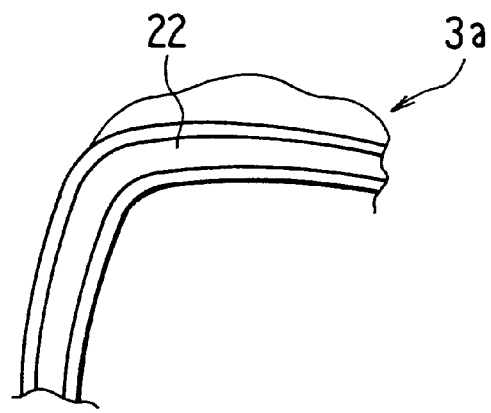
FIG. 2 is an enlarged view of a portion shown by a circle II of FIG. 1.
Figure 3:
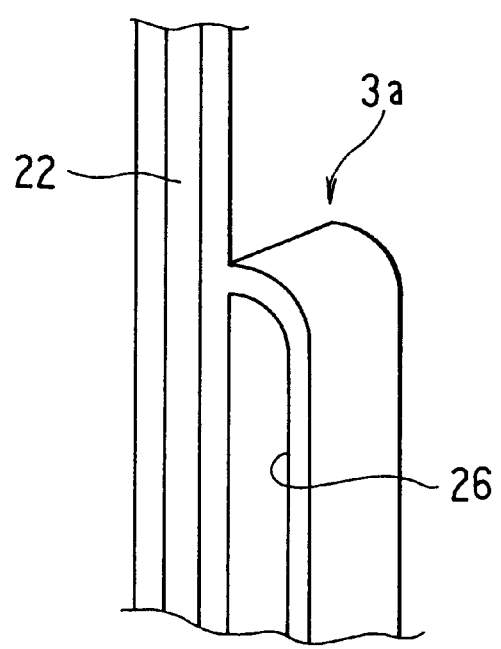
FIG. 3 is an enlarged view of a portion shown by a circle III of FIG. 1.
Figure 4:
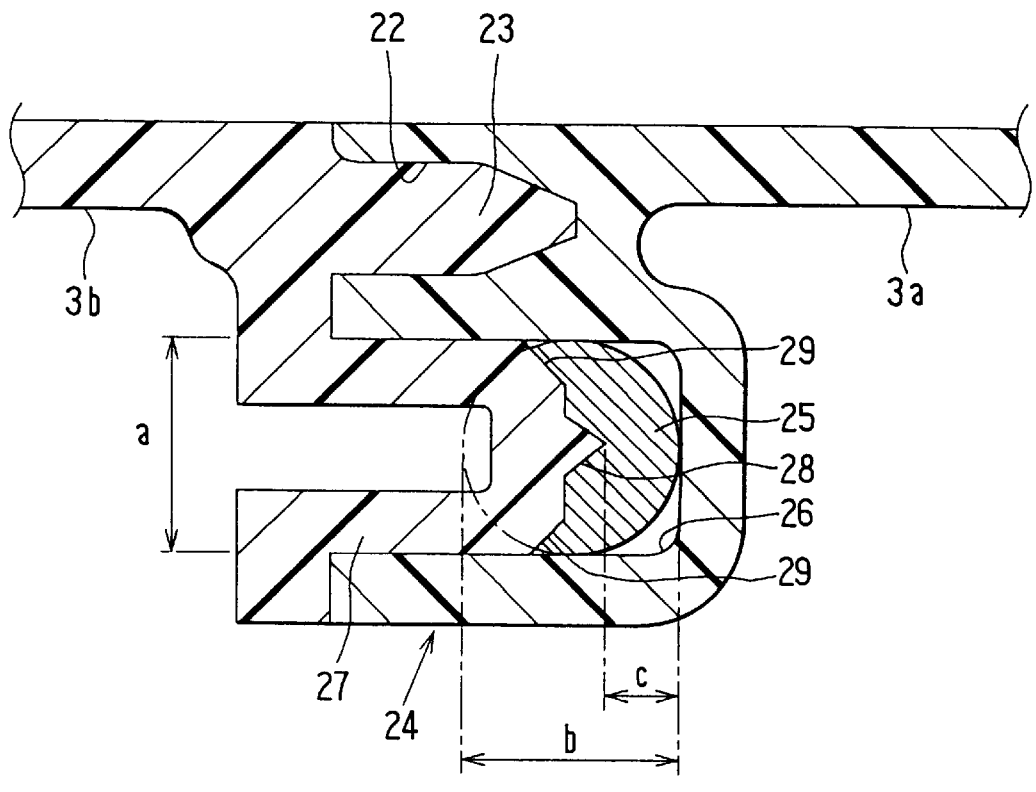
FIG. 4 is a cross sectional view taken along the line IV—IV of FIG. 1.

FIG. 2 is an enlarged view of a portion shown by a circle II of FIG. 1. FIG. 3 is an enlarged view of a portion shown by a circle III of FIG. 1. FIG. 4 is a cross sectional view taken along the line IV—IV of FIG. 1 in which the division case 3a and the division case 3b are assembled.

As shown in FIG. 2, the division surface (connecting surface to be connected to the division case 3b) of the division case 3a is formed with a groove portion 22 to be depressed in the assembling direction of the division case 3a and the division case 3b. The groove portion 22 is formed entirely on the division surface of the division case 3a, as shown in FIG. 1.

On the other hand, as shown in FIG. 4, the division surface (connecting surface to be connected to the division case 3a) of the division case 3b is formed with a projecting portion 22 projecting toward the division case 3a. The projecting portion 23 is formed entirely on the division surface of the division case 3b to be consistent with the groove portion 22 formed in the division case 3a.

As shown in FIG. 4, when the division cases 3a and 3b are assembled, the projecting portion 23 fits into the groove portion 22. The groove portion 22 and the projecting portion 23 perform not only a positioning function when the division cases 3a and 3b are assembled but also a sealing function to increase assembling force and to prevent the air in the temperature adjusting unit portion 3 from leaking to the outside.

In this embodiment, in the state where the evaporator 6 is accommodated in the division cases 3a and 3b, there is provided a sealing mechanism 24 at the divided portion between the division cases 3a and 3b below the evaporator 6.

That is, because the division cases 3a and 3b have the vertically divided type structure, condensed water generated in the evaporator 6 may flow between the division surfaces of the division case 3a and the division case 3b by its own weight. As a result, there occurs a problem in that the condensed water leaks outside the temperature adjusting unit portion 3.

In this embodiment, this problem is handled as follows. That is, as shown in FIG. 4, between the division surfaces of the division cases 3a and 3b located at a lower position in the gravitational direction of the evaporator 6, there is interposed a sealing member 25 while being compressed. The sealing member 25 seals between the division surfaces to prevent the condensed water from leaking to the outside of the division cases 3a and 3b.

Describing in detail, the sealing member 25 is made of fluidized foam material, and in this embodiment, as shown in FIG. 1, the sealing member 25 is formed in a stick shape and in a circular shape in a cross section thereof (in this embodiment, the diameter is 4.5 mm) by using isocyanate group contained as main component. The containing percentage of the isocyanate is highly set to approximately 1.8%.

In this embodiment, a recovery percentage of the sealing member 25 after being endured in a high-temperature and high-humidity is increased by increasing the isocyanate chainside containing percentage. The higher the recovery percentage is, the more the sealing performance improves.

Figure 5:
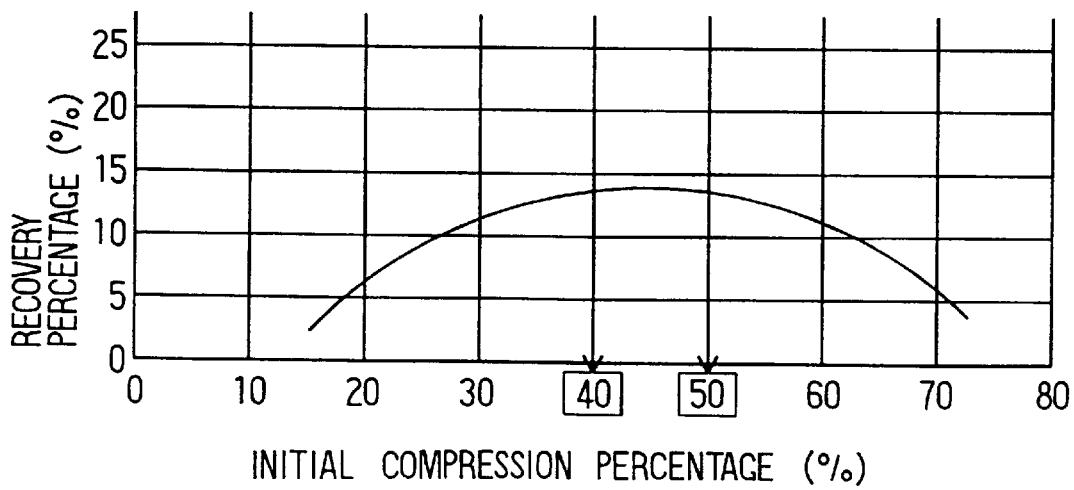
FIG. 5 is a correlationship between an initial compression percentage and a recovery percentage in the embodiment.
Figure 6:
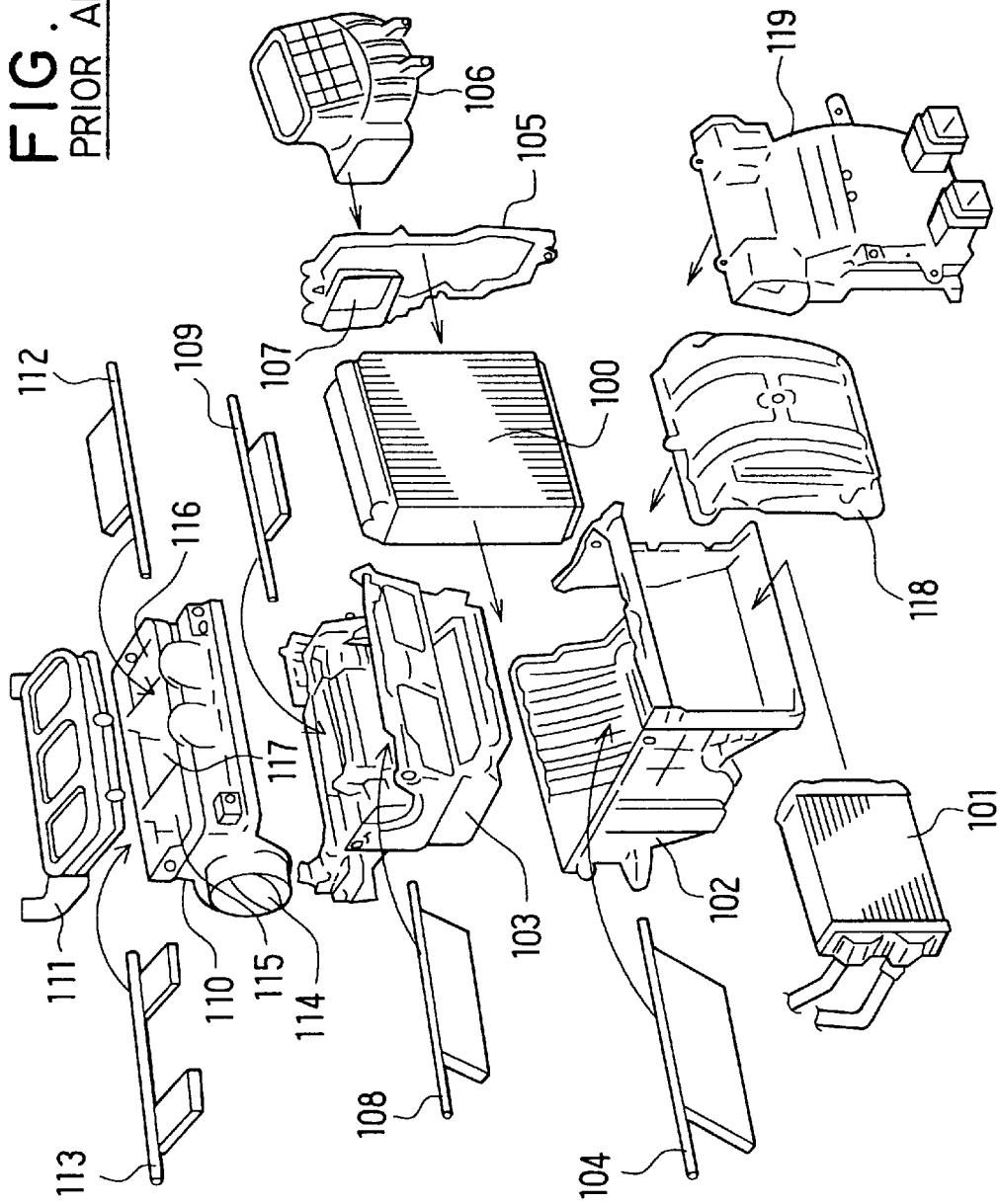
FIG. 6 is a view showing a disassembled structure of a conventional air conditioner for a vehicle.

Further, in this embodiment, to enhance the recovery percentage after being endured in the high-temperature and high-humidity, an initial compression percentage is set to 40%–50%. Experimental data are shown in FIG. 5, and the recovery percentage after being endured in the high-temperature and high-humidity indicates how the shape of the sealing member 25 recovers to the initial state when the sealing member 25 is released after the sealing member 25 has been exposed under a high-temperature and high-humidity while being compressed for a long time (e.g., at 80° C. and 95% Rh, for 72 hours). The recovery percentage H can be expressed as:

$$H=[(H2-H1)/H0] \times 100 \ (\%)$$

wherein H0, H1, and H2 are heights in the compressing direction of the sealing member 25, as shown in FIG. 4. The H0 ("b" in FIG. 4) is an initial height (before compressed) of the sealing member 25, i.e., a diameter in this embodiment, the H1 ("c" in FIG. 4) is a height of the sealing member 25 compressed, and the H2 ("c" in FIG. 4) is a height of the sealing member 25 after being left for one day, for example.

The initial compression percentage indicates how many percentage of the volume is compressed in a state where the sealing member 25 is initially compressed.

As being understood in FIG. 5, in this embodiment, it is preferable that the initial compression percentage should be to approximately 40%–50% to enhance the recovery percentage after being endured in the high-temperature and high-humidity.

This sealing member 25 is, as shown in FIG. 4, inserted into a groove-shaped sealing member accommodating portion 26 formed in the division case 3a while being depressed in the assembling direction (vehicle width direction). The above-described groove portion 23 is, as shown in FIG. 4, formed in the division surface inside the sealing member accommodating portion 26, of the division case 3a. The sealing member 25 may be manually inserted into the sealing member accommodating portion 26 by a worker.

That is, one of the reasons why the cross section of the sealing member 25 is formed in the circular shape is to improve the working efficiency by eliminating the direction for an installation thereof. As for a size of the sealing member accommodating portion 26, in this embodiment, the groove width (the width shown by "a") is set to 4.5 mm.

On the division surface opposed to the sealing member accommodating portion 26, of the division case 3b, as shown in FIG. 4, there is formed a projection-shaped insertion portion 27 to be inserted into the sealing member accommodating portion 26 in the state where the division cases 3a and 3b are assembled.

The insertion portion 27 is, as shown in FIG. 4, formed on the division surface outside the projection portion 23, of the division case 3b in the state where the division cases 3a and 3b are assembled. On the top end portion of the insertion portion 27, an inclination portion 29 is formed by being cut into a taper shape. On further top of the inclination portion 29 of the insertion portion 27, there is formed a compressing portion 28 projecting as a triangular shape.

As shown in FIG. 4, when the division case 3b is assembled (by using the above-described connecting means such as screws and claw fittings) after the sealing member 25 has been inserted into the sealing member accommodating portion 26, the insertion portion 27 is fit into the sealing member accommodating portion 26 so that the sealing member 25 is compressed.

In this embodiment, in the state where the division cases 3a and 3b are assembled, the initial compression percentage of the sealing member 25 is set to 40–50%, as described above, and further, a filling ratio of the sealing member 25 is set to be small as much as possible, because the durability of the sealing member 25 improves when a filling ratio is small.

Here, describing the initial compression percentage and the filling ratio, the initial compression percentage K can be expressed as:

$$K=(1-c/b)\times 100 \ (\%)$$

wherein "b" is a height of the sealing member 25 when not compressed in the compressing direction in FIG. 4 (the right direction of the vehicle width direction in FIG. 4), and "c" is a height of the sealing member 25 in the state where the division cases 3a and 3b are assembled, i.e., a height from a bottom surface of the sealing member accommodating portion 26 to a top end of the compressing portion 28).

In a relationship between a cylinder and a piston in an engine, the filling ratio is considered as a fraction in which a whole volume of the cylinder is a numerator and a space volume enclosed by the cylinder and the piston when the piston moves to a predetermined position in the cylinder in a compressing stroke is a denominator. That is, in this embodiment, because the sealing member 25 is formed in a columnar shape having an identical circular cross section, the filling ratio is defined as the following fraction.

Firstly, as shown by a two-dot chain line in FIG. 4, the circular cross sectional area before the sealing member 25 is compressed is taken as the numerator. On the other hand, as shown in FIG. 4, the denominator is the cross sectional area enclosed by the top end portion (28, 29) of the insertion portion 27 and an inner surface of the sealing member accommodating portion 26, without the existence of the sealing member 25, in the state where the sealing member 25 is compressed while the division cases 3a and 3b are assembled.

Accordingly, in this embodiment, for example, when the top end portion of the insertion portion 27 is formed in a flat surface without forming the compressing portion 28 and the initial compression percentage is set to 40–50%, the sealing member 25 is crushed because there is no way out, the filling ratio is increases, and it is considered that the durability of the sealing member 25 may deteriorate.

That is, to obtain the initial compression percentage 40–50% in the case the top end portion of the insertion portion 27 is formed in a flat surface without forming the compressing portion 28 the insertion portion 27 should be inserted more deeply into the sealing member accommodating portion 26, the sealing member 25 is further compressed so that the filling ratio may be increased.

In this embodiment, by forming the mountain-shaped compressing portion 28, as compared with when the compressing portion 28 is not formed, it is not necessary to insert the projection portion 27 into the sealing member accommodating portion 26, even if the sealing member 25 is compressed, the sealing member 25 deforms to escape toward each side of the compressing portion 28 (up-down direction in FIG. 4). Therefore, the increase of the filling ratio can be suppressed, and the condensed water can be certainly prevented from leaking between the division surfaces of the division case 3a and the division case 3b. Further, while being compressed by the inclination portion 29, the sealing member 25 is crushed and deforms so as to escape, so that the filling ratio can be further decreased.

In this embodiment, the sealing member 25 which deforms so as to escape is brought into a pressure contact with a clearance between the sealing member accommodating portion 26 and the insertion portion 27, so that the sealing performance can be improved to further prevent the condensed water from leaking between the division surfaces.

The filling ratio can be lowered to 1 while the initial compression percentage is in a range of 40–50%; however, in this case, substantial sealing portion of the sealing member 25 is the portion between the compression portion 28 and the sealing member accommodating portion 26; and therefore, it is difficult to further improve the sealing performance. Accordingly, to some degree, the sealing member 25 is crushed by the insertion portion 27 to set the filling ratio to be more than 1, and it is preferable that the sealing member 25 should be brought into a pressure contact with the inner surface of the insertion portion 27 and the sealing member accommodating portion 26.

Further, as shown in FIG. 4, the groove portion 22 is formed in the division surface inside the sealing member accommodating portion 26, of the division case 3a; and therefore, when the condensed water flows between the division surfaces of the division cases 3a and 3b, the condensed water firstly passes through the clearance between the projection portion 23 and the groove portion 22 and then reaches the sealing member 25.

That is, the condensed water flows through the clearance between the groove portion 22 and the projection portion 23; however, the clearance forms a labyrinth structure by the projection portion 23 and the groove portion 22. As a result, it becomes difficult for the condensed water to reach the sealing member 25, so that the condensed water can be further certainly prevented from leaking between the division surfaces. Further, this condensed water is discharged from a drain pipe 41 integrally formed with a lower portion of the division case 3a.

As described above, in the present invention, the evaporator 6 and the heater core 7 are accommodated and held in the temperature adjusting unit portion 3 composed of the two division cases 3a and 3b, and the division cases have the vertically divided type structure in which the division surfaces are disposed on a vertical direction, so that the number of the division cases of the air conditioner for a vehicle can be remarkably reduced. In this way, there are obtained advantageous effects of the reduction of the number of the parts of the division cases and the reduction of the assembling processes.

Further, when the above-described structure of the division cases is employed, by interposing the sealing member 25 between the division surfaces of the division cases 3a and 3b, it is possible to certainly prevent the condensed water from leaking between the division surfaces.

The embodiment of the present invention has been described as above; however, the present invention can be employed in modifications as described below.

In the above-described air conditioner unit 1, when the evaporator 6 is checked or changed, the division case 3a and the division case 3b should be disassembled; however, for example, a removal opening for checking and changing is formed in the division case 3a, through which the evaporator 6 or the heater core 7 may be pulled out.

In each of the above-described embodiment, the sealing member 25 is formed in a stick shape and in a circular shape in a cross section thereof; however, the sealing member 25 may be formed of any material and in any shape, which can prevent the condensed water from leaking to the outside.

Further, in each of the above-described embodiments, the projection portion 23 and the groove portion 22 are disposed inside the sealing member accommodating portion 26 and the insertion portion 27; however, those may be disposed outside.

In each of the above-described embodiments, the evaporator 6 and the heater core 7 are lined in the vehicle front-rear direction; however, those may be lined in the vehicle width direction, for example, or may be disposed in any direction.

In each of the above-described embodiment, the groove portion 22 and sealing member accommodating portion 26 are formed in the division surface of the division case 3a, and the projection portion 23 and the insertion portion 27 are formed in the division surface of the division case 3b; however, for example, the projection portion 23 and sealing member accommodating portion 26 may be formed in the division surface of the division case 3a, and the groove portion 22 and the insertion portion 27 may be formed in the division surface of the division case 3b.

What is claimed is:

1. An air conditioner for a vehicle, comprising:
    an air conditioning case forming a passage leading toward a passenger compartment;
    a cooling heat exchanger accommodated and disposed in said air conditioning case, for cooling air in said air conditioning case; and
    a heating heat exchanger accommodated and disposed in said air conditioning case, for heating air in said air conditioning case; wherein,
    said air conditioning case is constructed by two division cases of vertically divided type, each of which has a division surface in a vertical direction, and
    a sealing member is provided between said division surfaces below said cooling heat exchanger in the gravitational direction, for sealing between said division surfaces.

2. An air conditioner according to claim 1, further comprising:
    a plurality of door members disposed in said air conditioning case, for changing a flow of air in said air conditioning case;
    wherein said plurality of said door members are held while being sandwiched between said two division cases.

3. An air conditioner according to claim 1, wherein, at division portions of two division cases below said cooling heat exchanger in the gravitational direction,
    a groove-shaped sealing member accommodating portion in which said sealing member is accommodated and disposed is formed in one division surface of said division cases,
    an insertion portion to be inserted into said sealing member accommodating portion is formed on the other division surface of said division cases, and
    said sealing member is compressed by said insertion portion in a state where said division cases are connected.

4. An air conditioner according to claim 3, wherein said sealing member is constructed by a sealing member formed in a stick shape and substantially in a circular shape in a cross section thereof.

5. An air conditioner according to claim 4, wherein said sealing member is made of fluidized foam material containing isocyanate group contained as main component.

6. An air conditioner according to claim 5, wherein said sealing member is compressed by an initial compression percentage in a range of 40 to 50%.

7. An air conditioner according to claim 3, wherein,
    inside or outside said sealing member accommodating portion and said insertion portion,
    in one division surface of said division cases, a projection portion projecting toward the other division surface is formed, and on the other division surface, a groove-shaped groove portion into which said projecting portion is fit is formed.

8. An air conditioner for a vehicle, comprising
    an air conditioning case forming a passage leading toward a passenger compartment;
    a cooling heat exchanger accommodated and disposed in said air conditioning case, for cooling air in said air conditioning case; and
    a heating heat exchanger accommodated and disposed at a downstream side of said cooling heat exchanger in said air conditioning case, for heating air in said air conditioning case; wherein,
    said air conditioning case is constructed by two division cases of vertically divided type, each of which has a division surface in a vertical direction, an air passage leading from a downstream side of said heating heat exchanger toward the passenger compartment being formed by connecting said two division cases, and
    a sealing member is provided between said division surfaces below said cooling heat exchanger in the gravitational direction, for sealing between said division surfaces.

9. An air conditioner according to claim 8, further comprising:
    a plurality of door members disposed in said air conditioning case, for changing a flow of air in said air conditioning case;
    wherein said plurality of said door members are held while being sandwiched between said two division cases.

10. An air conditioner according to claim 8, wherein, at division portions of two division cases below said cooling heat exchanger in the gravitational direction, a groove-shaped sealing member accommodating portion in which said sealing member is accommodated and disposed is formed in one division surface of said division cases, an insertion portion to be inserted into said sealing member accommodating portion is formed on the other division surface of said division cases, and said sealing member is compressed by said insertion portion in a state where said division cases are connected.

11. An air conditioner according to claim 10, wherein said sealing member is constructed by a sealing member formed in a stick shape and substantially in a circular shape in a cross section thereof.

12. An air conditioner according to claim 11, wherein said sealing member is made of fluidized foam material containing isocyanate group contained as main component.

13. An air conditioner according to claim 12, wherein said sealing member is compressed by an initial compression percentage in a range of 40 to 50%.

14. An air conditioner according to claim 10, wherein, inside or outside said sealing member accommodating portion and said insertion portion, in one division surface of said division cases, a projection portion projecting toward the other division surface is formed, and on the other division surface, a groove-shaped groove portion into which said projecting portion is fit is formed.

\* \* \* \* \*